May 11, 1926.
A. T. J. BAHR
STARTING GATE.
Filed Feb. 21, 1925
1,583,951
4 Sheets-Sheet 4
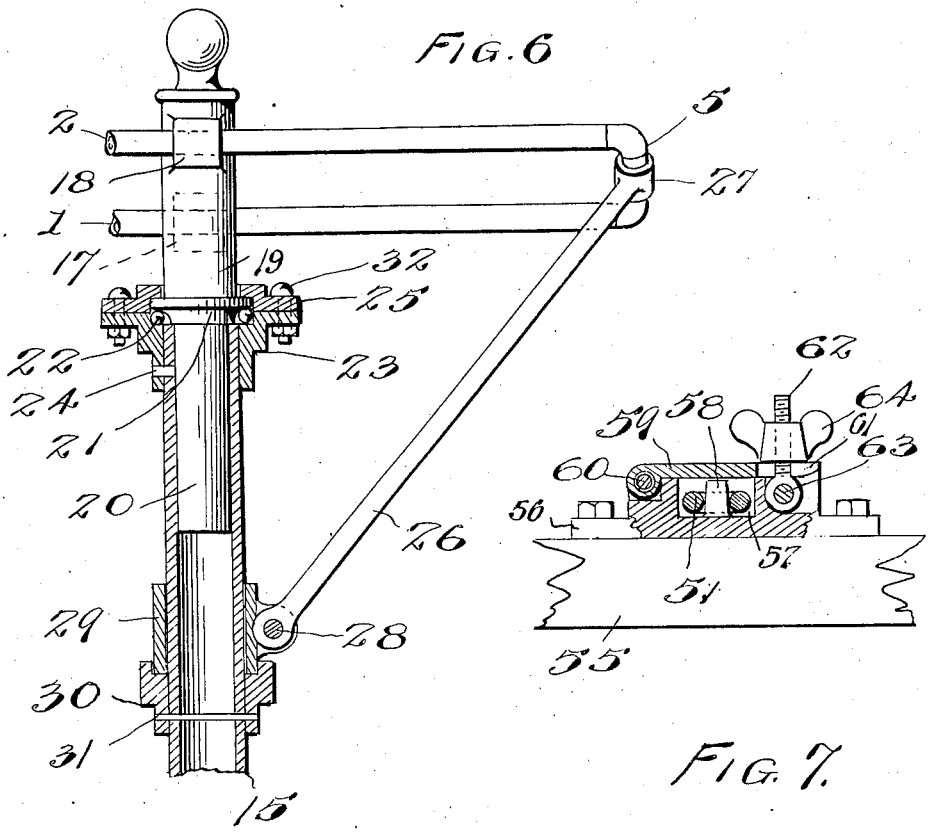
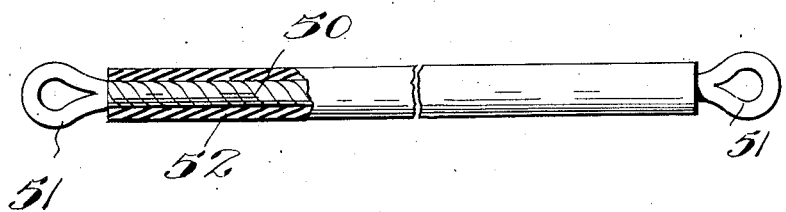
August T. J. Bahr, INVENTOR
BY Thomas R. Harney ATTORNEY Patented May 11, 1926.

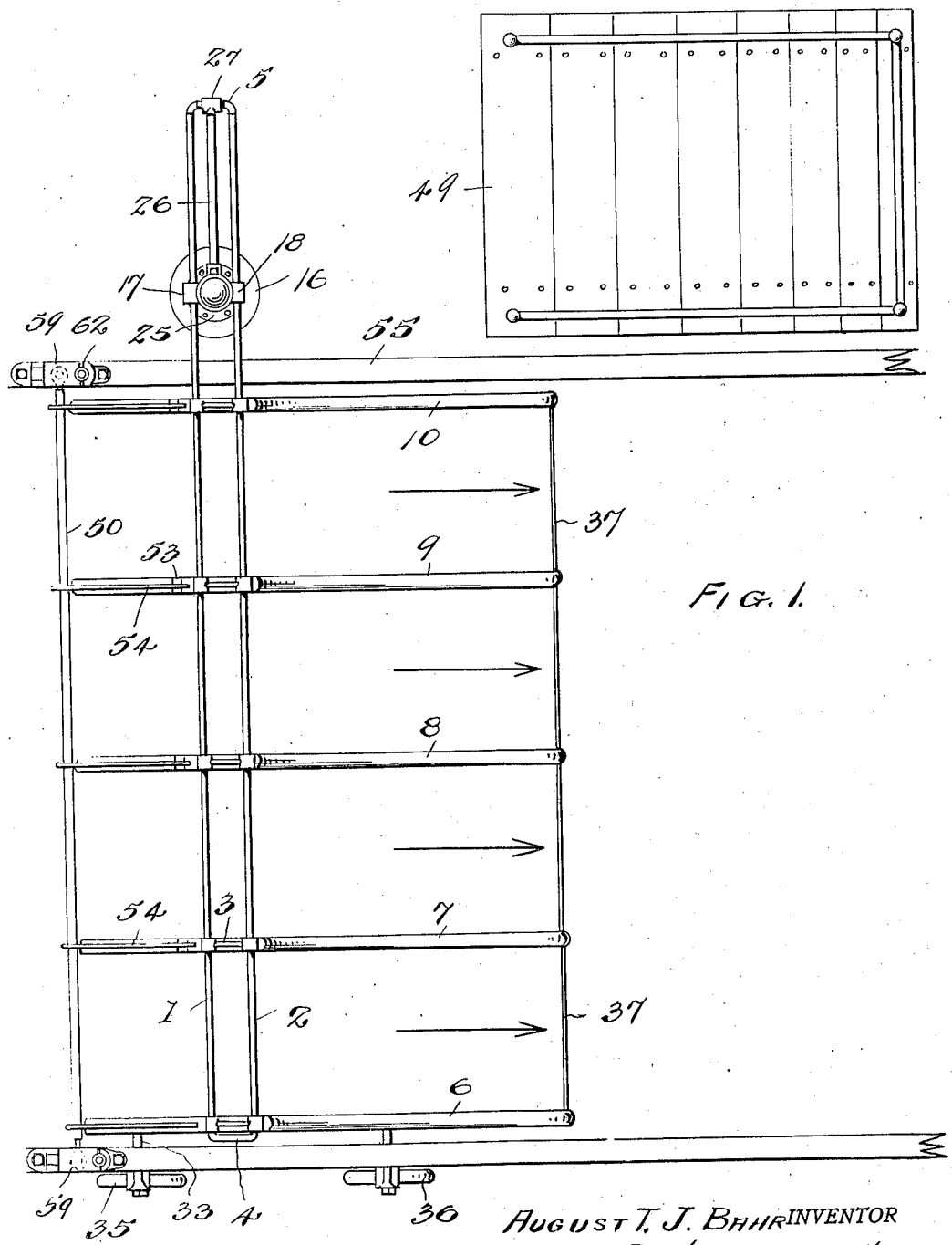

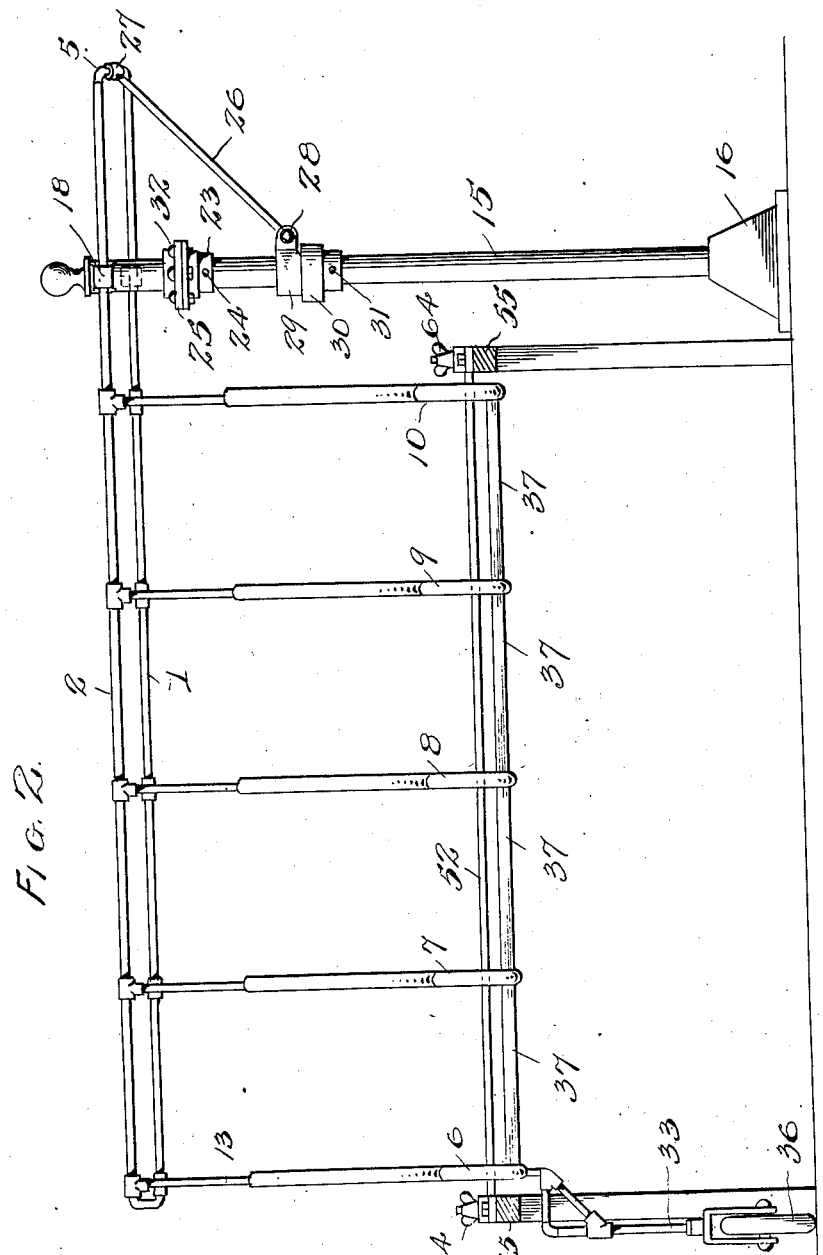

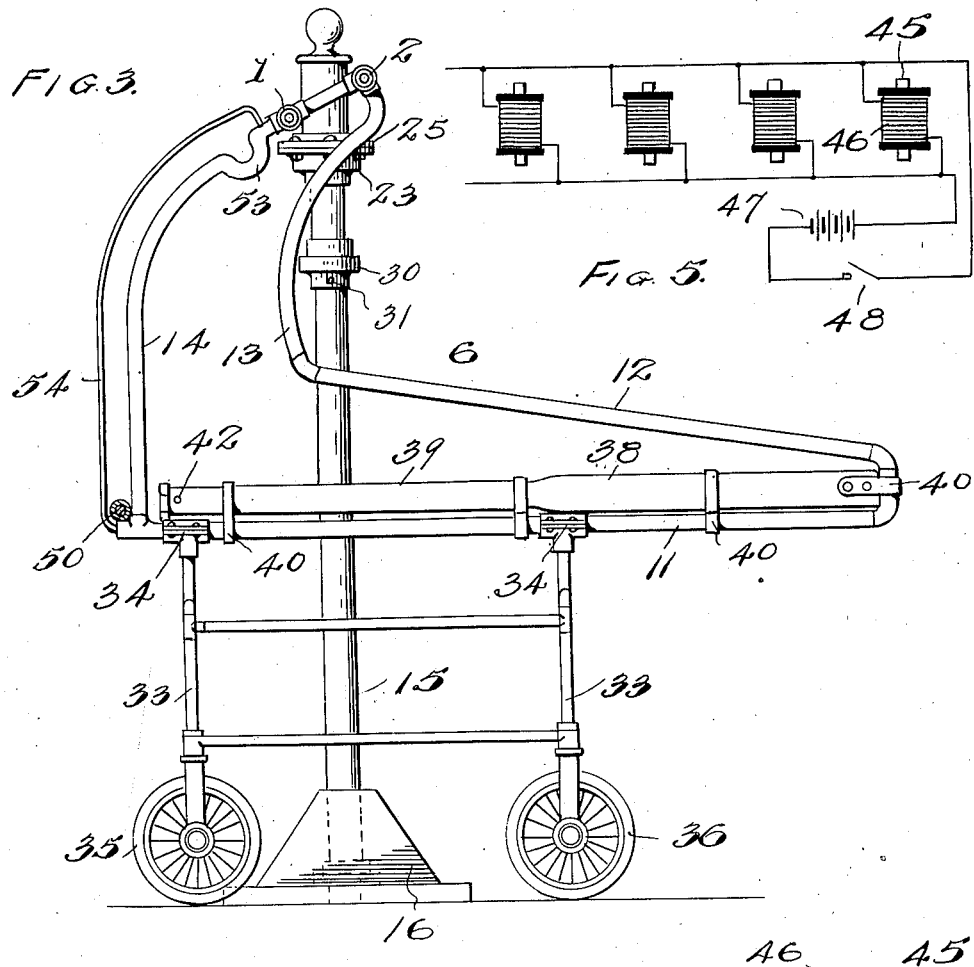

1,583,951

UNITED STATES PATENT OFFICE.

AUGUST T. J. BAHR, OF ST. LOUIS, MISSOURI, ASSIGNOR OF THREE-FOURTHS TO JOHN HOWARD QUINN, OF ST. LOUIS, MISSOURI.

STARTING GATE.

Application filed February 21, 1925. Serial No. 10,783.

My present invention relates to improvements in starting gates for use at race tracks for the purpose of insuring a fair and even start of the horses.

The invention contemplates the use of a horizontally rotary gate, which is portable, and equipped with the necessary number of stalls for accommodating the horses. The gate is adapted to be swung into position across the track for facilitating the start of the horses, and after the start it is swung to one side of and parallel with the track for clearing the track for the finish.

The gate or implement is compactly arranged and includes a minimum number of parts which may be assembled with convenience and the gate may be erected or taken down from its supporting post and again erected at a selected point, with convenience and dispatch.

The stalls are provided with individual barrier tapes for holding the horses in alinement at the start, and the barriers are released simultaneously when the starting signal is given. A rear barrier is also provided for retaining the horses in the line up preparatory to the starting signal.

The horses are separated by the use of padded walls forming the stalls, thus preventing the end horses from crowding the intermediate horses and also preventing one jockey from interfering with another at the start. Other meritorious features will appear upon an inspection of the drawings and as hereinafter set forth. The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a plan view of the implement or starting gate with parts all set for accommodating the horses before the starting signal is given.

Figure 2 is a front view in elevation of the gate as seen from the right in Figure 1.

Figure 3 is a view in elevation at the free end of the gate (left side of Figure 2) with the pads for the stall walls or partitions removed for convenience of illustration.

Figure 4 is a view of one of the several barriers showing its housing in section, with the barrier tape in position to restrain the horse.

Figure 5 is a diagram of the electrical arrangement including four solenoids for simultaneously releasing the four barrier tapes.

Figure 6 is an enlarged detail view partly in section showing the mounting for the rotary gate.

Figure 7 is a sectional view of one of the locks for the rear barrier.

Figure 8 is a detail view showing the ends of the rear barrier.

In the drawings for convenience of illustration I have limited the size of the gate to four stalls but it will of course be understood that the gate may be lengthened and equipped with a great number of stalls as desired to accommodate the usual number of horses starting in a race.

In carrying out my invention I preferably use tubular bars or rods in the framework of the gate and stalls to insure light weight with sufficient strength for the purpose, and it will be understood that the gate is to be manipulated by hand, that is, pushed or pulled into and out of starting position by one or two attendants. The rear barrier is manually operated, but the forward barriers or starting tapes, one for each stall, are electrically controlled in order that they may automatically and simultaneously be released. After release, and before the next start, the individual barriers are manually placed in position or stretched across the fronts of the stalls.

I utilize a light but strong horizontally extending beam which is preferably made up of piping or hollow rods of suitable size and shape and indicated as 1 and 2. These hollow rods are elevated to the proper position and joined by transverse or cross bars 3 and end bars 4 and 5, to complete the gate beam. From this beam a plurality of side walls or partitions indicated as 6, 7, 8, 9, 10, are rigidly suspended to form four stalls to accommodate a like number of horses. Preferably these walls are padded with batting or similar material and covered with fabric or leather for the protection of the horses and jockeys.

Each stall partition comprises an elevated frame suspended from the gate beam having a lower horizontal bar 11, an upwardly and rearwardly extending inclined bar 12, and two curved bars 13 and 14, the latter bar being connected to the bar 1 of the gate beam and the former bar being connected to the bar or rod 2 of the beam. All joints between the pipe sections of the various frames are made with elbow and T couplings to facilitate the assembly of the parts and to reduce the cost of production of the implement.

The frames for the stall partitions which separate the horses are of proper size and shape to adapt them to the purpose for which they are intended and the frames are spaced at the proper intervals along the beam to accommodate the horses.

One end of the supporting gate beam is rotatably supported from a gate post 15 which has a suitable base 16 to form a rigid support for the post and gate. The two hollow rods of the beam are passed through and supported in perforated lugs or bosses 17 and 18 located at opposite sides of the spindle 19, the shank or lower end 20 of which spindle is supported to rotate by an annular flange or bearing shoulder 21 at the upper end of the post 15.

The spindle is provided with ball bearings 22 in a flanged bearing collar 23 secured to the post as by a pin 24. A removable retaining ring 25 which is bolted to the collar 23 completes the ball bearing for the gate, and it will be apparent that the gate may swing in a horizontal plane to starting position across the track, or to position alongside and parallel with the track.

To strengthen the gate structure the beam is carried beyond the rotatable support and a removable brace link 26 is carried loosely by means of the sleeve 27 on the end bar 5 of the beam. This link extends downwardly and diagonally toward the post and is bolted at 28 in perforated ears or lugs on a rotary sleeve 29 surrounding the post 15. A flanged collar 30 pinned to the post at 31 forms a support for the sleeve 29 to rotate in.

It will be understood that the post 15 with its fixed collars is a stationary and permanent fixture, one or more of which may be located at suitable starting points along the race track, while the beam with its stalls, pintle and brace link may be removed and erected to position on a selected post. By removing bolts 28 and the bolts 32 of the bearing ring 25 the gate and its parts may readily be detached for this purpose.
At the free end of the gate a wheel frame 33 is attached as by brackets 34 to the last stall frame 6, and a pair of wheels 35 and 36 of any suitable type have swiveled bearings in this frame to support the free end of the gate and relieve it of undue strains.

The gate may be swung on its pivot post into position across the track after the horses have paraded forward and backward opposite the judges' stand and returned to the left of the gate in Fig. 1. With the gate in position the horses enter the open stalls (which have been closed by the front barrier tapes) from the rear and stand between the stall partitions. One of these individual front barrier tapes 37 is fully illustrated in Figure 4. The barrier is made up of flexible material and carried in a housing 38 which is formed as a flat vertical portion of the tubular casing or pipe 39 which is attached by straps 40 to the wall frame of the stall and located between the bars 11 and 12 of the frame. The barrier tape is held in retracted position within its housing by means of a spring 41 to which it is anchored at one end. The rear end of the spring is anchored at 42 within its housing or casing 39. A rubber tipped eyelet 43 is affixed at the free end of the barrier tape which tape is pulled through the lateral opening 44 at the front end of the housing 38, and this eyelet is passed over a latch bolt on the next adjoining stall frame. Such a latch bolt may be the core as 45 of a solenoid 46, four of which are illustrated in Figure 5, and one of which is carried on each of the stall partitions 7, 8, 9 and 10. The padding or covering for the frame work also covers the solenoids or electrical apparatus at the front ends of the stall partitions, and it will be understood that the entire exterior portion of the partitions presents a smooth and comparatively soft surface for protection to the jockeys and horses.

The solenoids are included in an electrical circuit having a battery 47 which may be located on the gate beam if desired, and a control switch 48, the switch being under control of the starter who stands on the platform 49 shown at the side of the track in Figure 1. The several wires of the circuit are carried across the beam and out on the stall frames to the fronts of the partitions where the solenoids are located, the lead wires to the switch being free and readily accessible for the starter when required.

By closing the switch 48 the solenoids will be energized to simultaneously withdraw their cores or latch bolts from the several eyelets on the free ends of the tapes, and the springs 41 quickly retract the barrier tapes and pull them into their housings 38 for the purpose of freeing the horses for the start of the race.

A rear barrier is also provided to prevent the horses from backing out of the stalls after the stalls have been entered from the rear. This barrier as illustrated in Figure 8 is preferably a strong wire cable or chain as 50, having end loops 51 and a rubber casing or shield 52 to protect the horses. The rear barrier is of sufficient length to extend across the track and is carried at all times by the gate. When not in use it is suspended in notches 53 of the frame bars 14 near the gate beam, until the horses have entered the stalls. After the horses have entered, the barrier is lowered by hand and slid down to position indicated in Figure 3. In its descent it is guided by guide bars 54 arranged parallel with and attached at the rear of the frame bars 14 of the stalls.

The flexible barrier is locked in position, not only for the purpose of restraining the horses, but also for the purpose of holding the gate against movement after it is once set. For this purpose I employ devices on a stationary support, as the side rails 55, along the track. As seen in Figure 7 a base plate 56 is bolted to each rail 55 and provided with a notch 57 in which is located a stud bolt 58 over which the loop at the end of the barrier is passed. A latch plate 59 hinged at 60 to the base plate is then turned down over the loop and stud bolt to retain the loop against displacement from its stud.

This latch plate 59 preferably has a notched end 61 for the reception of a bolt 62 swiveled at 63 in the base plate and a wing nut 64 is employed to clamp the latch plate in place. After the horses have started the gate is released by quickly loosening the wing nuts to permit swinging of the bolts out of the notched latch plates. The plates may then be turned back to permit withdrawal of the looped ends of the rear barrier and the barrier is lifted by hand to its seat in the notches 53. The gate may then be swung to position parallel with and at the side of the race track, out of the way of the horses.

Having thus fully described my invention what I claim as new and desire to secure by Letters Patent is—

1. In a portable rotary starting gate, the combination with a fixed post having a bearing, of a pintle having bearings thereon for co-action with the first bearing, a horizontal gate beam, spaced partitions supported from said beam to form stalls, and means for temporarily holding the stalls in starting position.

2. In a rotary starting gate, the combination with a fixed post, of a gate beam having a pintle rotatable in the post, spaced partitions supported from said beam to form stalls, a removable front barrier for each stall, and means for simultaneously releasing said barriers.

3. In a rotary starting gate, the combination with a fixed post, of a gate beam rotatably supported on the post, spaced partitions supported from said beam to form stalls, a removable front barrier for each stall, each said barrier being supported from one partition and means for attaching its free end to an adjoining partition, and means for simultaneously releasing said barriers.

4. In a starting gate the combination with a fixed post, of a beam rotatable thereon, spaced partitions forming stalls suspended from said beam, a removable front barrier for each stall, and a single rear barrier common to all the stalls, and means for anchoring said rear barrier to hold the gate.

5. In a starting gate, the combination with a pair of spaced stall-partitions, of a combined casing and housing carried by one partition, a spring anchored in the casing and a barrier tape located in the housing and connected to said spring, a latch on the other partition for holding the tape extended, and means for releasing said latch to permit release of the tape.

6. In a starting gate, the combination with a rotary beam having spaced stall-partitions thereon, of a combined rear barrier and lock for the gate comprising a member extending transversely of the partitions, means on the partitions for holding the barrier in suspended position, stationary supports and locking devices thereon, and means at the ends of said barrier for co-action with said devices to lock the gate.

7. In a rotary starting gate the combination with stall-partitions having frames, of a rear barrier and notches in said frames for supporting said barrier in elevated position, stationary supports on a lower plane than said notches and locking devices on said supports, said barrier having looped ends for co-action with said locking devices.

8. In a rotary starting gate the combination with spaced stall frames having elevated notches and rear guide rods, of a rear barrier adapted for support in elevated position in said notches, stationary supports and locking devices thereon, said barrier having looped ends for co-action with said locking devices.

In testimony whereof I have affixed my signature.

AUGUST T. J. BAHR.